US008731069B2

(12) United States Patent
Sunakawa

(10) Patent No.: US 8,731,069 B2
(45) Date of Patent: May 20, 2014

(54) REMOTE DISPLAY SYSTEM AND METHOD

(75) Inventor: Shinichi Sunakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1717 days.

(21) Appl. No.: 11/464,750

(22) Filed: Aug. 15, 2006

(65) Prior Publication Data

US 2007/0053667 A1 Mar. 8, 2007

(30) Foreign Application Priority Data

Aug. 25, 2005 (JP) ................. 2005-244388

(51) Int. Cl.
| H04N 7/12 | (2006.01) |
| H04N 11/02 | (2006.01) |
| H04N 11/04 | (2006.01) |
| G06K 9/00 | (2006.01) |
| G03B 13/00 | (2006.01) |
| H04N 5/232 | (2006.01) |

(52) U.S. Cl.
USPC ............ 375/240.27; 382/147; 348/349

(58) Field of Classification Search
USPC .................................. 375/240.27
See application file for complete search history.

(56) References Cited

U.S. PATENT DOCUMENTS

| 5,351,067 A * | 9/1994 | Lumelsky et al. ............ 345/561 |
| 5,481,297 A * | 1/1996 | Cash et al. ................. 348/14.12 |
| 6,675,387 B1 * | 1/2004 | Boucher et al. ............... 725/105 |
| 2002/0087995 A1 * | 7/2002 | Pedlow, Jr. ..................... 725/87 |
| 2002/0141740 A1 | 10/2002 | Matsui |
| 2003/0120802 A1 | 6/2003 | Kohno |
| 2006/0109805 A1 * | 5/2006 | Malamal Vadakital et al. ............................. 370/299 |

FOREIGN PATENT DOCUMENTS

| JP | 09-074548 A | 3/1997 |
| JP | 2001-045098 A | 2/2001 |
| JP | 2001-045476 A | 2/2001 |
| JP | 2002-141964 A | 5/2002 |
| JP | 2003-032690 A | 1/2003 |
| JP | 2003-169040 A | 6/2003 |
| JP | 2004-096309 A | 3/2004 |
| JP | 2004-172957 A | 6/2004 |
| JP | 2005-086677 A | 3/2005 |

OTHER PUBLICATIONS

Hannuksela et al., "Sub-Picture: ROI Coding and Unequal Error Protection", IEE ICIP 2002, pp. 537-540.*

* cited by examiner

*Primary Examiner* — Hee-Yong Kim
(74) *Attorney, Agent, or Firm* — Canon USA Inc. IP Division

(57) ABSTRACT

A remote display system having a server to transmit moving image content data to a network, and a display terminal to receive and reproduce/display the image data, transmits the image data to which an error resilience code is attached, displays the image content together with other display elements on the display terminal, determines a display shape of the image content in the display, and changes an error resilience method in accordance with a result of the display shape determination.

3 Claims, 17 Drawing Sheets

| OVERLAPPING STATE | ERROR RESILIENCE STRENGTH |
|---|---|
| TOP | High |
| TRANSPARENCY 80% ~ | High |
| TRANSPARENCY 60% ~ | Mid |
| TRANSPARENCY 40% ~ | Mid |
| TRANSPARENCY 20% ~ | Mid |
| TRANSPARENCY 0% ~ | Low |
| BACKGROUND | Low |

FIG.9

| SLICE NUMBER | AGGREGATION | TERMINAL 82 | TERMINAL 83 | TERMINAL 84 | TERMINAL 85 | N.A. | N.A. |
|---|---|---|---|---|---|---|---|
| 31 | Mid | Low | Low | Mid | Low | — | — |
| 32 | High | High | High | Mid | High | — | — |
| 33 | High | High | High | Mid | High | — | — |
| 34 | High | High | High | Mid | High | — | — |
| 35 | High | High | High | Mid | High | — | — |
| 36 | High | High | High | Mid | Low | — | — |
| 37 | High | Mid | Low | Mid | Low | — | — |
| 38 | Mid | Mid | — | Mid | Low | — | — |
| 39 |  |  |  |  |  |  |  |

91  92  93  94  95  96  97  98

REMOTE DISPLAY SYSTEM AND METHOD

BACKGROUND OF THE INVENTION

1. Field of the Invention

The present invention relates to an image forming apparatus and a control method thereof, a computer program, and a computer readable storage medium.

2. Description of the Related Art

A VOD (Video On Demand) streaming system and a network monitoring system have been known as an apparatus for displaying/reproducing remote moving image content via a network. In the VOD streaming system, content stored on a remote server is viewed on a personal computer connected to a network. In the network monitoring system, an image taken by a remote monitoring camera is displayed on a personal computer or a dedicated monitor connected to a network for monitoring.

These systems are constructed by connecting a storage server or camera server with a personal computer or display terminal apparatus via a network. In order to view the image on a personal computer, various kinds of software such as an application for viewing content are needed. Image data is compressed using formats such as MPEG-2 and MPEG-4 to reduce data quantities and is packetized for transmission. The RTP protocol is used in most cases as a transmission protocol to reduce communication bandwidth and simplify control.

When the RTP protocol is used for transmission, a data loss on a network is a problem. Due to abnormal routing paths or disturbances in a network, packet losses, delays, or changed order of arriving packets may occur. This causes phenomena such as a sudden stop of moving images and a deformation of part of a screen, leading to significant degradation of reproducing/displaying quality.

Countermeasures against data losses during transmission of image data using the RTP protocol are given as shown below:

(1) First, a method of combining with a retransmission protocol is available. By a combined use of the RTP protocol with a retransmission protocol such as TCP/IP, a re-transmission demand is made using the re-transmission protocol when a data loss occurs. A display control operation is performed after performing buffering to wait for arrival of re-transmitted data in an input stage on a receiving apparatus side (See, for example, Japanese Patent Application Laid-Open No. 2003-169040).

(2) A method of increasing error resilience of the RTP protocol is available. This method is generally named FEC (Forward Error Correction). By adding a redundant code on a transmitting side in advance, data can be restored on a receiving side even if a packet loss occurs during transmission. Redundant encoding using Tornado code, LT code, or Reed-Solomon code is well known. A group of n packets is formed and, based on the group, m packets are generated (n<m). If a packet loss occurs, content of the lost packet can be restored using other packets in the group (See, for example, Japanese Patent Application Laid-Open No. 2001-045098).

Methods shown below are provided as examples of performing a more fine-tuned control operation.

(3) A method of selecting an error resilience method based on information about a congestion state of a network, terminal load, buffering state, or user instruction, has been devised. A statistical information observation unit collects the above information and switches an algorithm of error resilience, particularly FEC and ARQ (See, for example, Japanese Patent Application Laid-Open No. 2002-141964).

(4) A method of receiving and reproducing image data by specifying one of a plurality of image data with various error resilience, has been devised. A plurality of video streams including I frames with different periodicity are stored on a server. After specifying one video stream using an instruction signal from a receiving terminal, the pertinent stream is delivered (See, for example, Japanese Patent Application Laid-Open No. 2003-032690).

(5) A method of dividing an image into areas and transmitting each area with a changed resolution of hierarchical encoding, has been devised. Image data is divided into areas and each area is coded hierarchically in a base layer and an enhancement layer. At the time of transmission, first, the whole area is transmitted with a resolution of the base layer and then enhancement layer data of important areas is transmitted within a range permitted by the communication bands (See, for example, Japanese Patent Application Laid-Open No. 2004-096309).

In the above conventional examples, however, there is a problem in that image quality and real-time are not compatible with each other. In the conventional examples (1) and (3), a large amount of buffering is needed to ensure an arrival wait time of are transmitted packet and thus, there is a disadvantage of significantly impairing real-time characteristic of display. In the conventional example (2), there is a problem in that, since a bandwidth in proportion to the error resilience strength is required, image quality is degraded if the error resilience is enhanced when the bandwidth remains constant. For example, while losses or screen deformations in units of lines or frames occur rarely, there are cases in which block noise, mosquito noise, or the like increases. In the conventional example (4), there is a problem in that image quality is uniformly determined by the type of stream provided by the server and there is no room for further improvement of image quality. In the conventional example (5), there is a problem in that the method is applicable only to hierarchically coded data.

SUMMARY OF THE INVENTION

The present invention provides a remote display system that significantly improves quality of a focused area while maintaining real-time characteristics by setting error resilience strength in accordance with a display state to each area of a screen.

According to an aspect of the present invention, a remote display system having a server that transmits moving image content data to a network, and a display terminal that receives, and then reproduces and displays the image data, includes a communication unit configured to transmit the image data to which an error resilience code is attached, a display shape receiving unit configured to receive a display shape of the image content on the display terminal, and an error resilience strength change unit configured to change an error resilience method according to a result of the display shape determining unit.

With a structure of the present invention as described above, display layout of content is detected and the error resilience strength is set to each area of the content in accordance with importance of the layout.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description, serve to explain the principles of the invention.

FIG. 9 illustrates an exemplary aggregation table of error resilience setting processing according to the second exemplary embodiment.

DETAILED DESCRIPTION OF THE EXEMPLARY EMBODIMENTS

Exemplary embodiments of the present invention will be described in detail below with reference to the accompanying drawings.

First Exemplary Embodiment

A remote display system in the present exemplary embodiment connects a server and a display terminal in one-to-one relation. The remote display system detects a display layout situation in each area of the content screen and lowers the error resilience strength for areas transparently overlapped or hidden by other objects.

<Examples of the Display Screen on the Display Terminal and Settings of the Error Resilience Strength (FIGS. 2 and 3)>

Figure 2:
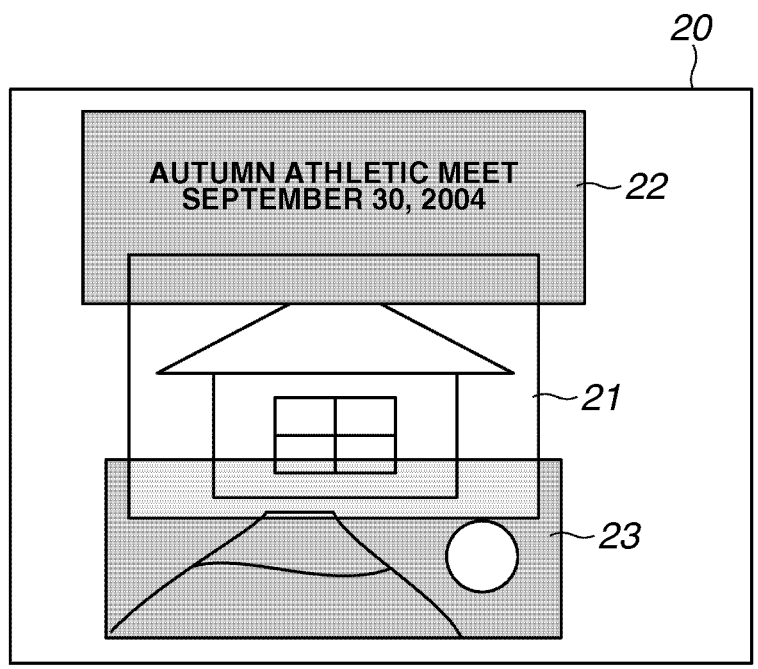
FIG. 2 illustrates an exemplary display screen of a display terminal according to the first exemplary embodiment.

FIG. 2 will be used to describe an example of the display screen on the display terminal. The display terminal in the present exemplary embodiment displays a plurality of image contents in multi-window display. Each of image contents can be displayed in a window form while it is placed in an arbitrary location within the display area in an arbitrary size. If a window interferes with other windows or objects, the window is hidden behind other windows or overlapping is performed with some transparency. In FIG. 2, reference numerals 21-23 denote windows for displaying image content. The window 21 displays streaming content transmitted from a network, and the windows 22 and 23 display image contents stored in memory inside a display terminal 50. With respect to the window 21, an upper portion is hidden behind the window 22 and a lower portion is transparently overlapped with the window 23.

Figure 3:
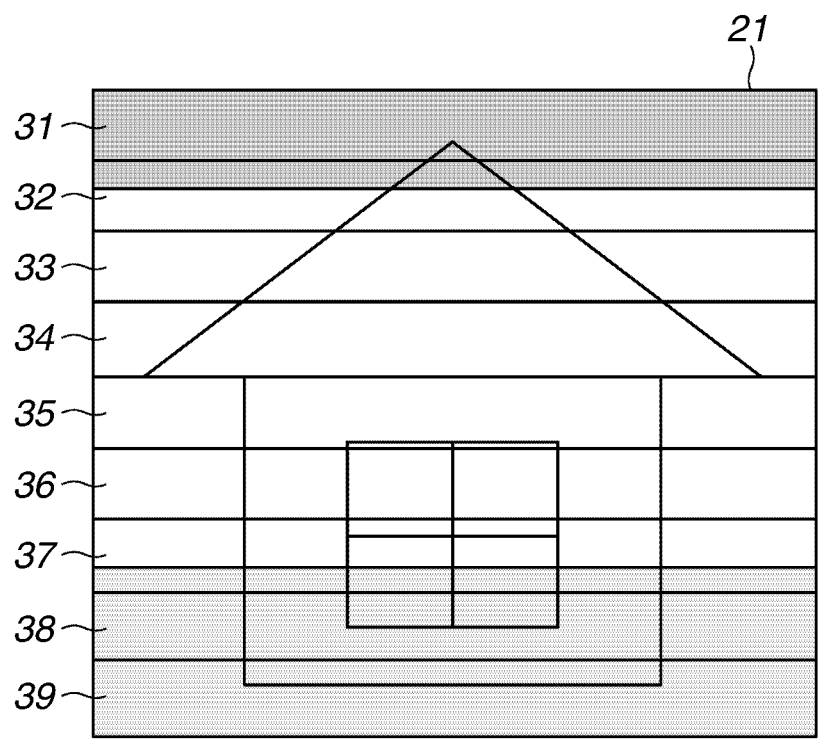
FIG. 3 is a diagram showing area division of a content screen of the display terminal according to the first exemplary embodiment.

FIG. 3 is a diagram for illustrating setting of the error resilience strength of a content image as an example. In the present exemplary embodiment, the error resilience strength is set based on the display state of each divided area. That is, lower error resilience strength is set to the areas hidden behind other windows or transparently overlapped. In FIG. 3, the screen of the window 21 is divided into nine band-like areas 31-39. The area 31 is hidden behind the window 22 and the areas 38 and 39 transparently overlap with the window 23. In this case, high resilience strength is set to the areas 32-37 where original image content is displayed, while a lower strength is set to the hidden area 31, and a medium strength is set to the transparently overlapped areas 38 and 39. Because the high error resilience strength is set to visually conspicuous areas, image quality can be maintained. On the other hand, by lowering the error strength for visually inconspicuous areas, quantities of transmission data can be reduced. If the communication band remains constant, higher data rates can be assigned to visually conspicuous areas to improve image quality.

<Overall Structure of the Remote Display System (FIG. 4)>

Figure 4:
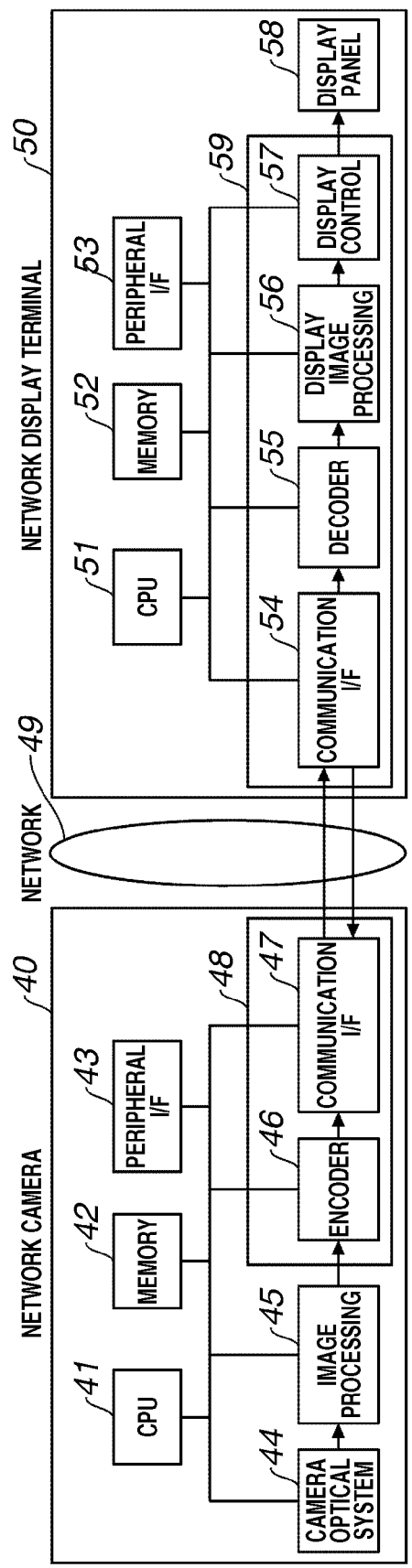
FIG. 4 is a block diagram showing an exemplary structure of the remote display system according to the first exemplary embodiment.

The block diagram in FIG. 4 will be used to describe the structure of the remote display system in the present exemplary embodiment. The remote display system in the present exemplary embodiment is a monitoring system comprised of a network camera server and a display terminal. Both apparatuses exchange image content data and control data via a network.

A network camera server 40 has a function to encode at a low rate an image taken by a camera and to transmit the image to the network. In the network camera server 40, a CPU 41 performs various control operations such as sequence management and setting of various operation parameters of each module inside the server 40. A memory unit 42 stores control programs and various parameters of the CPU 41, and also stores data of photographed images. A peripheral interface 43 controls various user interfaces such as a switch and various peripheral interface apparatuses such as a memory card. A camera optical control unit 44 includes a lens, a sensor, a lens driving motor, and a control system. An image processing unit 45 makes various corrections such as a γ correction and white balance to output data from the sensor.

An image transmitting unit 48 transmits image data to the network, and details thereof will be described later. The image transmitting unit 48 includes an encoder 46 and a communication interface (I/F) 47. The encoder 46 converts captured image data to low-rate compression data. In the present exemplary embodiment, data is converted into the Motion-JPEG format, but any other formats can also be used. For example, Motion-JPEG 2000, MPEG-1, MPEG-2, MPEG-4, H.263, H.264, and the WMV format of Microsoft can be used. The communication interface 47 transmits compressed image data to the network after packetizing the data. In the present exemplary embodiment, data is packetized in the RTP format after error resilience encoding is performed, and then transmitted using the UDP/IP protocol over a network 49.

A display terminal 50 reproduces/displays input image data from the network in a multi-window format. In the display terminal 50, a CPU 51 performs various control operations such as sequence management and setting of operation parameters of each module inside the display terminal 50. The CPU 51 also controls setting of the display layout according to instructions of application programs or users. A memory 52 stores control programs and various parameters of the CPU 51. A peripheral interface 53 controls various user interfaces such as a switch and various peripheral interface apparatuses such as a memory card. A display panel 58 displays/reproduces a multi-window screen. Various display panels such as CRT, LCD, plasma panels, and FEC can be used.

An image receiving unit 59 receives image data from the network, and details thereof will be described later. The image receiving unit 59 includes a communication interface 54, a decoder 55, a display image processing unit 56 and a display control unit 57. The packetized image data is input through the communication interface 54. This interface 54 is configured such that data transmitted by the communication interface 47 of the network camera server 40 can be received. The decoder 55 decompresses the compressed image data. In the decoder 55, a compression format of the encoder 46 can be decompressed. The display image processing unit 56 makes various corrections such as a γ correction, gradation correction, and color tone correction according to the property of the display panel. If necessary, various conversions such as the resolution conversion are also performed. The display control unit 57 outputs a driving timing signal and display image data.

<Structure of the Image Transmitting Unit and Image Receiving Unit (FIGS. 1 and 5)>

Figure 1:
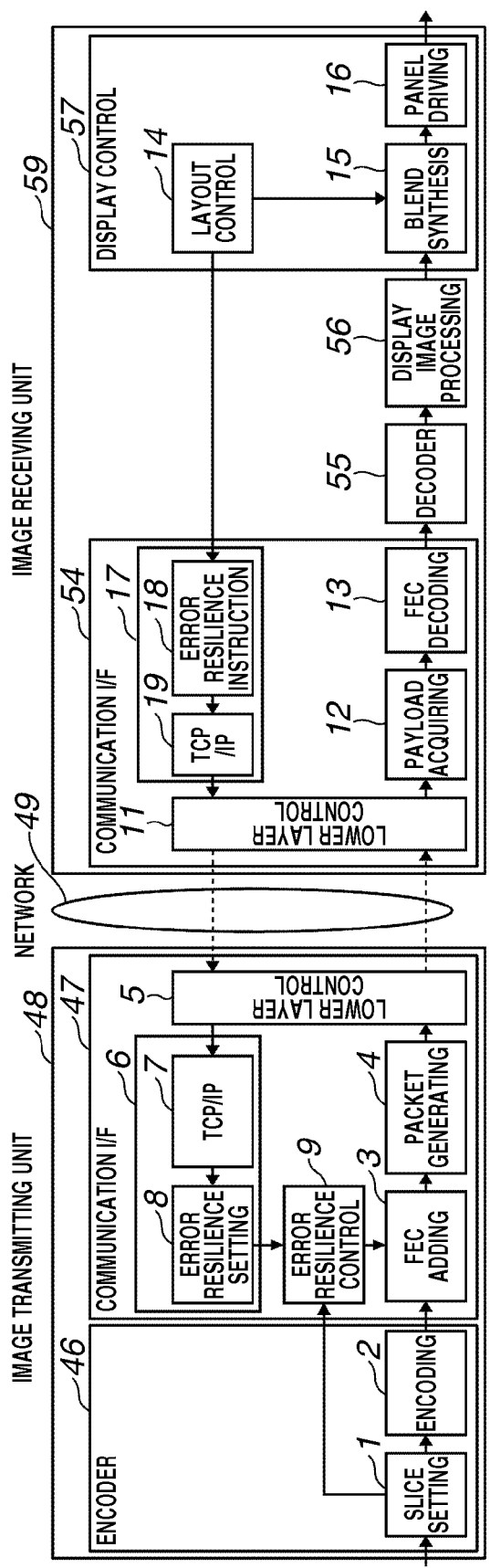
FIG. 1 is a block diagram showing an exemplary structure of an image transmitting unit and a receiving unit of a remote display system according to a first exemplary embodiment.

Next, with reference to the block diagram in FIG. 1 the structure of the image transmitting unit 48 and image receiving unit 59 are described in detail. After the image data is encoded to the compressed format, the image transmitting unit 48 performs error resilience encoding with a different strength for each image area. Then, the image transmitting unit 48 packetizes and transmits the data. The image receiving unit 59 restores lost packets based on the error resilience code and decodes the compressed format to create display control data. Also, the error resilience strength is set to each screen area in accordance with a display layout state.

The image transmitting unit 48 is comprised of the encoder 46 and communication interface 47.

The encoder 46 compresses data in units of slices in order to improve error resilience. As illustrated in FIG. 3, a screen is divided into a plurality of slice areas and data compression is performed on each divided area. A code named a re-synchronization marker is attached to the head of each slice so that, even if data is lost, the relevant slice can still be decoded. In the encoder 46, a slice setting unit 1 divides a screen into areas, which are units for encoding. In the present exemplary embodiment, a horizontal strip-shaped slice is set in consideration of encoding efficiency of Motion-JPEG. The slice is comprised of a plurality of macro-blocks and a slice boundary matches with macro-block boundaries. When any other encoding method is used, an arbitrary boundary shape can be adopted by taking encoding performance into consideration. Since the H.264 method allows any shape of the slice structure in units of macro-blocks, control can be performed so that a slice shape is formed in which an overlapped state is reflected. Slice structure information is notified to the display terminal 50 when connection or transmission is started. When the slice structure is dynamically changed, notification should be sent each time a change is made. An encoding unit 2 performs DCT encoding or entropy encoding according to a procedure of Motion-JPEG to make a conversion to a low-rate data sequence.

In the communication interface 47, blocks 3-5 perform transmission processing of image data. An FEC adding unit 3 performs error resilience encoding for each slice. With the strength specified by an error resilience control unit 9 described later, encoding is performed. Any encoding method, for example, the Reed-Solomon code and turbo code can be used. A packet generating unit 4 generates packets in RTP or UDP/IP format. A lower layer control unit 5 transmits packet data by controlling the protocols of the MAC layer and PHY layer.

Blocks 7 and 8, on the other hand, perform processing according to a setting demand command output by the display terminal 50. The processing is carried out by software of a communication control CPU 6. Programs and data memory are incorporated in the communication control CPU 6 and processing is performed according to the incorporated programs. The setting demand command is communicated using packets in the TCP/IP format. TCP/IP control processing 7 performs packet reception processing according to the protocol. Error resilience setting processing rewrites a control table of the error resilience control unit 9 according to a setting demand command of the display terminal 50.

Figure 5:
FIG. 5 is a diagram showing a control table of an error resilience control unit according to the first exemplary embodiment.

The error resilience strength control unit 9 outputs an instruction signal of the error resilience strength according to a slice position. The error resilience control unit is comprised of a control table that associates the slice position and error resilience strength. The table is searched in accordance with a slice number output by the slice setting unit 1 and a corresponding error resilience strength signal is output. In accordance with the error resilience strength signal, error resilience encoding is performed by the FEC adding unit 3. FIG. 5 shows an example of the error resilience control table and is written so that a slice number 61 and an error resilience strength setting 62 pair off. FIG. 5 is an example of tabulation of the image in FIG. 3 and a slice 31 has the strength "Low" because it is a hidden area. A slice 38 is a transparently overlapped area, therefore, is set to the strength "Mid."

The image receiving unit 59 is comprised of the communication interface 54, decoder 55, display image processing unit 56, and display control unit 57.

First, the flow of image data will be described. In the communication interface 54, a lower layer control unit 11 controls the PHY layer and MAC layer protocols. A packet acquiring unit 12 analyzes RTP and UDP/IP packets and fetches payload. An FEC decoding unit 13 decodes error resilience coded data. Further, if a packet is lost, the FEC decoding unit 13 restores the lost packet using packets that have arrived.

The decoder 55 decompresses data compressed by the encoder 46. Even when a packet loss cannot be restored in a previous step, the slice structure is retrieved using the re-synchronization marker to continue decoding in units of slices. The display image processing unit 56 makes, as described above, various corrections adapted to characteristics of the display panel.

The display control unit 57 is comprised of a layout control unit 14, a blend synthesis unit 15, and a panel driving unit 16. The layout control unit 14 outputs instructions such as the size and position of each window, overlapping among windows, and window end face processing, according to settings of the CPU 51. The blend synthesis unit 15 blends and composes each content image according to instructions of the layout control unit 14 to create display screen data. The display screen data is stored in VRAM (not shown) and is read according to demand from the panel driving unit 16. The panel driving unit 16 creates a driving timing signal adapted to the display panel and reads and outputs display image data in accordance with the driving timing.

Next, the flow of demand control to change the error resilience strength will be described. Software of a communication control CPU 17 performs demand control processing. Programs and data memory are incorporated in the communication control CPU 17 and processing is performed according to the incorporated programs. Reference numeral 18 denotes error resilience instruction processing which determines the error resilience strength of each area of screen according to the display layout and transmits a setting demand command to the server 40. When the display layout is updated, the error resilience instruction processing is started by notification from the layout control unit 14, and then creates and outputs a setting demand command in accordance with the display state. The flow of the processing will be described later. Reference numeral 19 denotes TCP/IP control processing which packetizes a setting demand command according to the protocol. Packets are transmitted to the network via the lower layer control unit 11.

<Description of the Flow of the Error Resilience Instruction Processing (FIGS. 6 and 7)>

With reference to the flow chart in FIG. 7, the flow of the error resilience instruction processing will be described. The processing is realized by software on the communication control CPU 17. When the display layout is updated, the processing is started to determine the error resilience strength in accordance with the layout state of each content area, and the processing creates and outputs a setting demand command.

Figure 7:
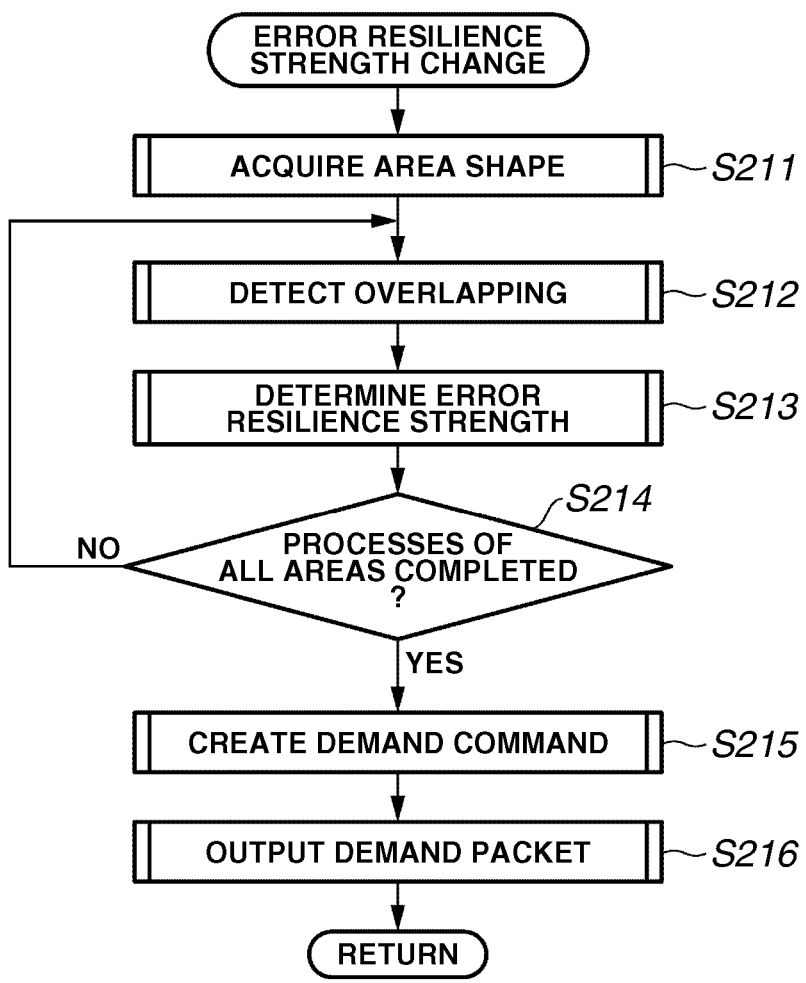
FIG. 7 is a flow chart showing a flow of the error resilience instruction processing according to the first exemplary embodiment.

In step S211 in FIG. 7, information about the shape of a divided content image is obtained. A setting value is notified from the slice setting unit 1 of the server 40 when connection or transmission is started. The setting value is stored in a memory of the communication control CPU 17 to be read out and referred to. Alternatively, in step S211, an inquiry can be made to the server 40. In step S212, overlapping of divided images is detected based on information about the layout control unit 14.

Figure 6:
FIG. 6 illustrates an exemplary determination table of error resilience instruction processing according to the first exemplary embodiment.

The network display terminal can also be configured such that an inquiry is made about an overlapping state to the CPU 51. In step S213, information about the overlapping state is used to determine the error resilience strength of a relevant area. For example, the error resilience determination table shown in FIG. 6 can be used for determining the error resilience. FIG. 6 shows a table in which an overlapping state 71 and error resilience strength 72 are associated. The overlapping state 71 is divided into seven levels of "top," "transparency 80%-," "transparency 60%-," "transparency 40%-," "transparency 20%-," "transparency 0%-," and "background." Three levels of strength "High, " "Mid," and "Low" are assigned to the error resilience strength 72. The resilience strength is determined based on a detection result of the previous step. Returning to the flow chart in FIG. 7, in step S214, it is determined whether determination processes of all areas are completed, and if they are completed (YES in step S214), the processing proceeds to step S215. If there still remain some areas to be determined (NO in step S214), the processing proceeds to step S212 to perform the determination processing of the next area. In step S215, a setting demand command of the error resilience strength is created. For example, as shown in FIG. 5, a command is created in a format in which the image area (slice) and the error resilience strength setting are associated with each other. Each setting can be given in text format or can be indicated by using several bits for encoding. In step S216, the setting demand command is output to the TCP/IP control processing and the error resilience instruction processing is completed.

When the display layout is changed after the above processing is completed, it is possible to determine the error resilience strength for each content area according to the layout state and make a setting change demand. Since the server 40 changes the error resilience encoding strength in accordance with a setting demand, control operation can be performed to lower the error resilience strength when interference with other display object occurs.

According to the present exemplary embodiment, as described above, by setting the error resilience strength in accordance with the display layout state for each screen area, image quality of a focused area can be greatly improved while maintaining real-time characteristic.

The present invention is not limited to the above exemplary embodiment and can be applied to a wide variety of uses.

For example, the determination processing of the error resilience strength can be performed on the server side. In such a case, the display terminal transmits display layout information or layout information of each content to the server. The server determines the importance of each screen area based on the display layout information and sets the error resilience strength.

Figure 11:
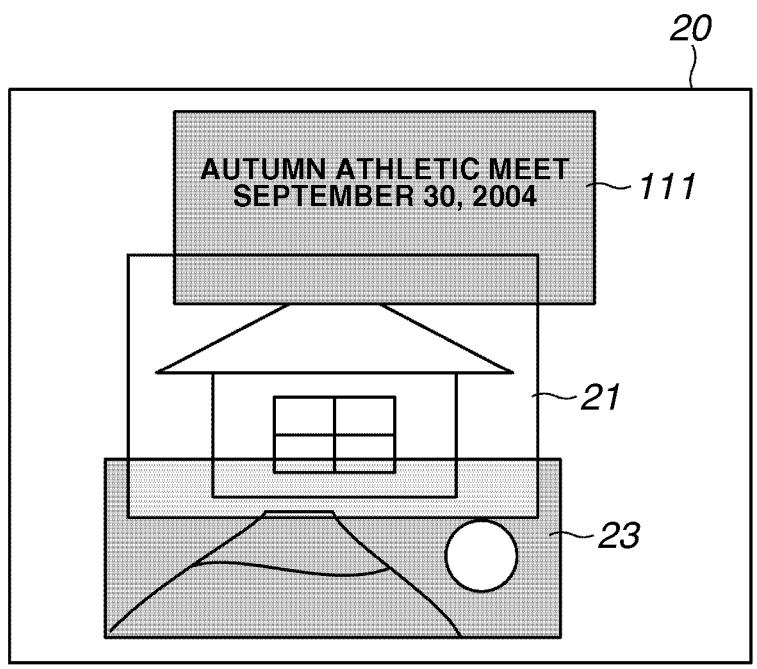
FIG. 11 illustrates an exemplary display screen of the display terminal according to the first exemplary embodiment.
Figure 12:
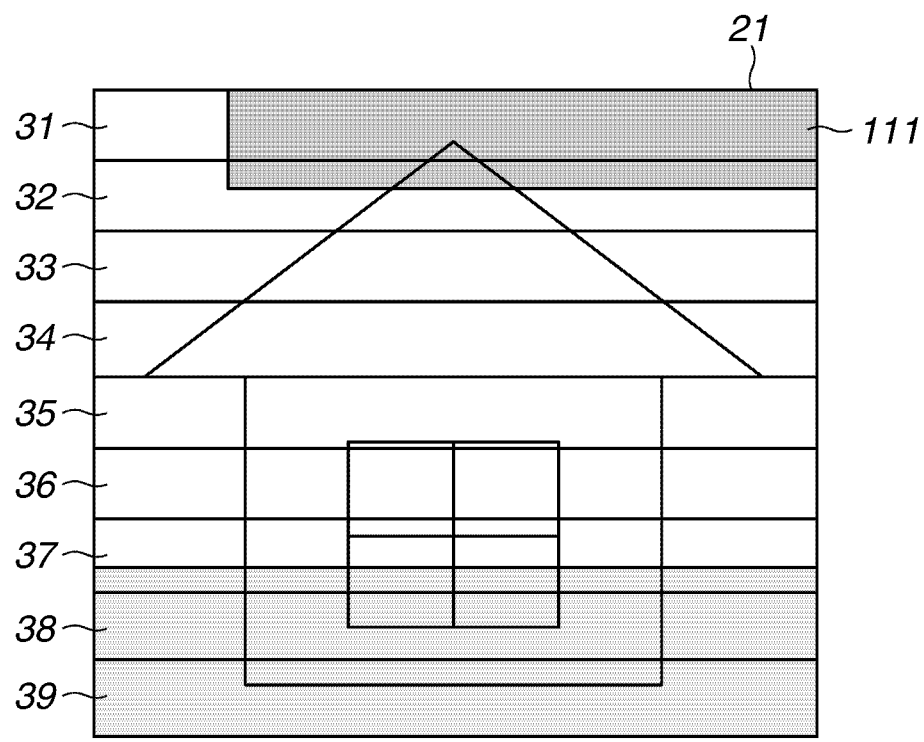
FIG. 12 is a diagram showing area division of the content screen of the display terminal according to the first exemplary embodiment.

Alternatively, the overlapping state of each area can be determined with more flexibility. In the present embodiment, a case is described in which the overlapping state of the slice areas is uniform. However, the present invention can also be applied to a case where the overlapping state is not uniform. For example, FIG. 11 shows a case in which slice areas partially overlap with each other. That is, a window 111 overlaps with the window 21 in a slanting direction from a right upper corner. FIG. 12 is a diagram showing an overlapping situation with slice areas. In FIG. 12, the slice 31 overlaps with the window 111, but not totally. In such a case, a control operation can be performed as follows. An area proportion of parts in which interference occurs, is calculated. If more than a predetermined proportion is hidden, it is determined that "the relevant area is hidden". Alternatively, the error resilience strength can be changed depending on the area proportion.

Further, by detecting overlapping conditions of displayed windows, the error resilience strength of contents of the second and subsequent windows can be uniformly lowered. Furthermore, by detecting whether a window screen is active (state in which an input operation can be accepted), the error resilience strength can be lowered.

Second Exemplary Embodiment

In the previous exemplary embodiment, a case is described in which a server and a display terminal are connected in one-to-one relation. In the present exemplary embodiment, a case is described in which a plurality of display terminals are connected to a server and data is delivered in multicasting. The server aggregates setting demands of each terminal and the error resilience strength of image areas that show a low level of importance among all terminals, is lowered.

<Overall Structure of a Remote Display System (FIG. 8)>

Figure 8:
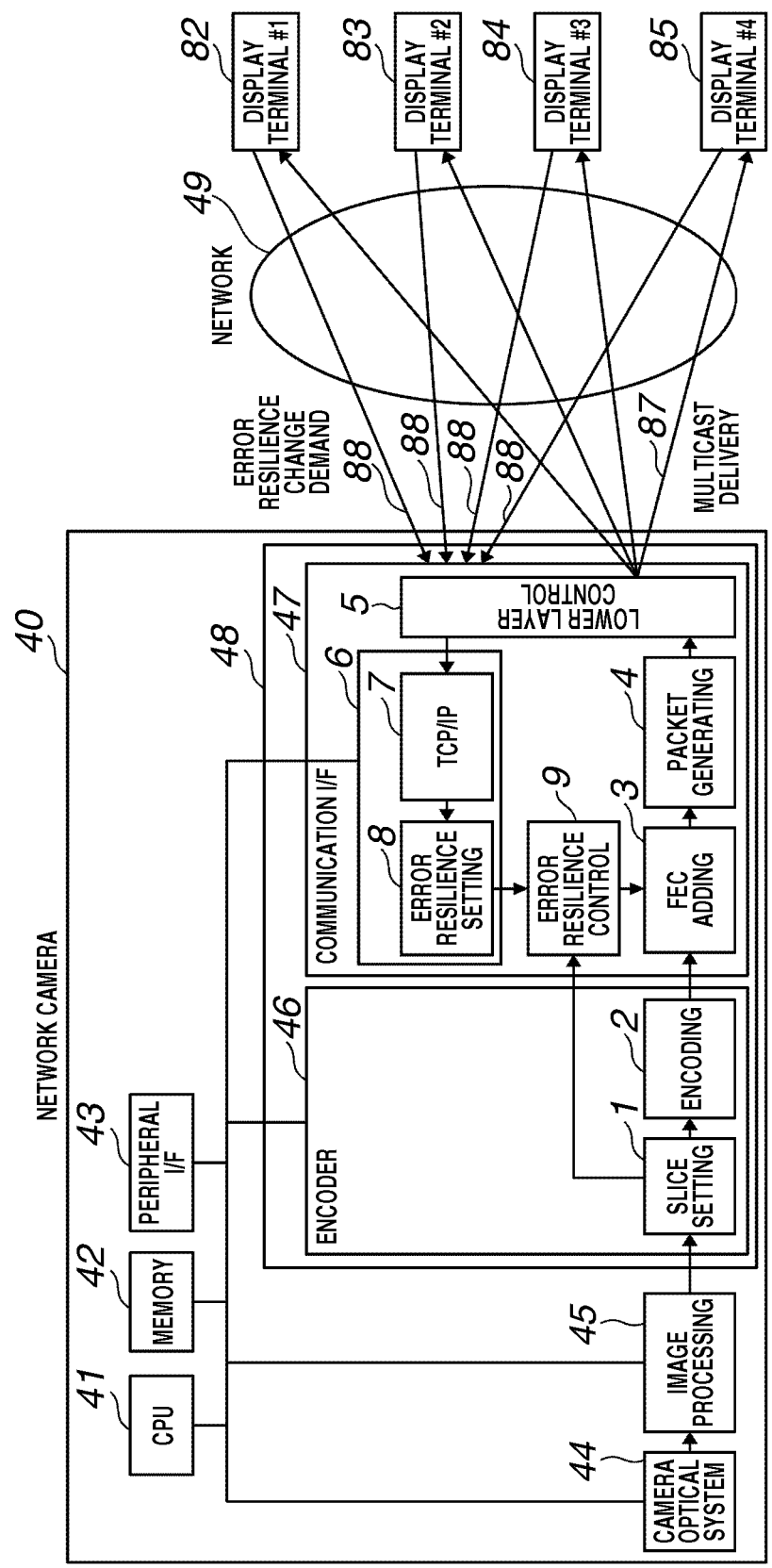
FIG. 8 is a block diagram showing an exemplary structure of a remote display system according to a second exemplary embodiment.

The block diagram in FIG. 8 will be used to describe the structure of a remote display system in the present exemplary embodiment. The same components as those in the previous exemplary embodiment are denoted by the same numbers and their descriptions are not repeated.

In FIG. 8, the network camera server 40 delivers data of captured images, in multicasting. Each of display terminals 82-85 has the same structure as the display terminal 50 in the previous exemplary embodiment. Multicast content images 87 are input into each display terminal to be displayed/played back in the multi-window format. If the display layout is changed in each display terminal, a setting demand command of the error resilience 88 is sent to the server 40. The error resilience setting processing 8 in the server 40 determines a setting value by aggregating the setting demand commands 88 from each display terminal and writing them to the control table of the error resilience control unit 9. The error resilience setting processing 8 creates a demand aggregation table in memory of the communication control CPU 6 and uses the table to compile the setting demand commands.

<Structure Example of the Demand Aggregation Table (FIG. 9)>

FIG. 9 illustrates an exemplary demand aggregation table that will be used to describe the flow of demand aggregation processing. In the present exemplary embodiment, demands 88 from all terminals are aggregated in tabular form and settings are made so that the error resilience strength of slices is lowered when the slices are consistently of low importance. Reference numeral 91 in FIG. 9 denotes a slice number, and reference numeral 92 denotes an error resilience setting after re-evaluation. Setting demand values of each display terminal are described in the description fields 93-98 in each column. In the example in FIG. 9, the description fields 93-96 are assigned to the display terminals 82-85, and the description fields 97 and 98 are blank because there is no terminal to receive the data.

In order to determine the setting 92, the maximum value is searched among the demands of all terminals, and the maximum value is determined to be the setting. If a demand of a high level of strength is made only by one terminal, the demanded strength is transmitted to maintain the image quality. If, on the other hand, all terminals demand only a low level of strength, the low strength is set to reduce the amount of communication data.

<Description of the Flow of the Error Resilience Setting Processing (FIG. 10)>

Figure 10:
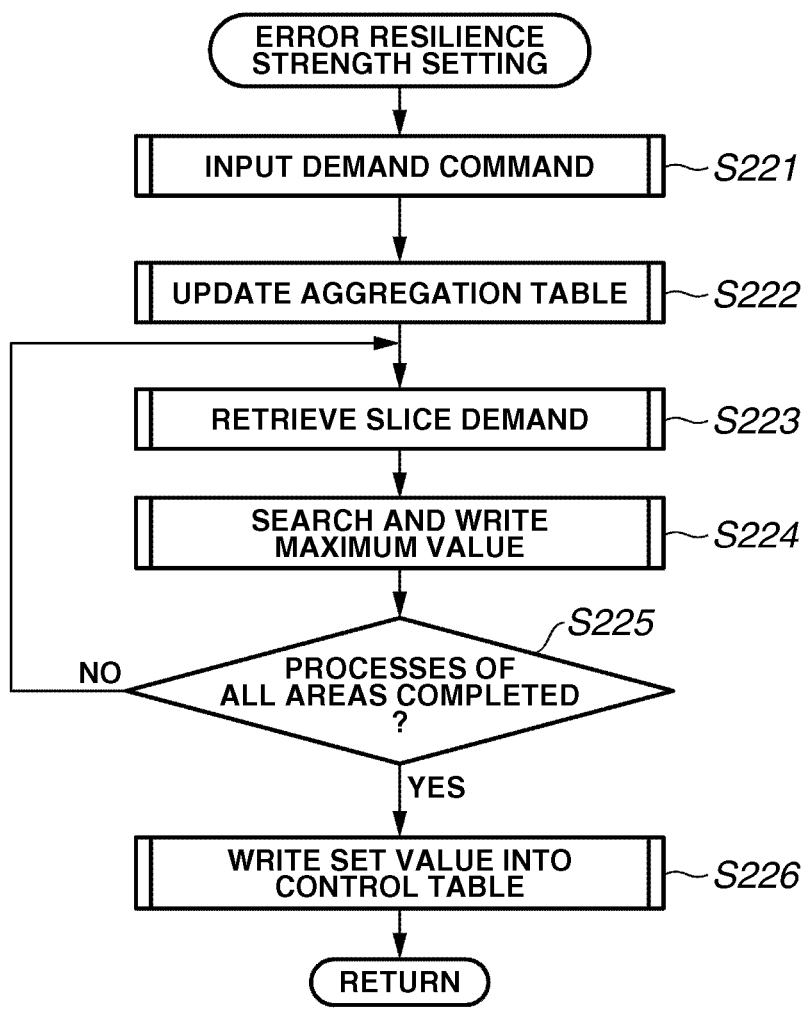
FIG. 10 is a flow chart showing the flow of the error resilience setting processing according to the second exemplary embodiment.

The flow chart in FIG. 10 will be used to describe the flow of the error resilience setting processing by the server 40. The processing is realized by the software on the communication control CPU 6. When a setting demand command arrives, the processing is activated to determine the error resilience strength by aggregating demands from all terminals and to rewrite the settings of the error resilience control unit.

In step S221 in FIG. 10, a setting demand command output from a display terminal is input. In step S222, an item of the relevant display terminal of the demand aggregation table is updated in accordance with the setting demand command. In step S223, setting demand values of all terminals are retrieved for each slice. In step S224, the maximum value is searched for among the demands of all terminals and written into the setting field 92. In step S225, it is determined whether evaluation of all slices is completed, and if completed (YES in step S225), the error resilience setting processing proceeds to step S226. If there still remain some areas to be processed (NO in step S225), the processing proceeds to step S223 to evaluate the next slice. In step S226, the setting value 92 is written into the error resilience control unit 9 and the error resilience setting processing ends.

In the above processing, if a setting demand is made, it is possible to reevaluate demands of all terminals and set the error resilience strength. This enables a setting in which the error resilience strength is lowered for slices whose importance is consistently low in all terminals.

According to the present exemplary embodiment as described above, the same effect as the previously described exemplary embodiment can be obtained. In addition, improved image quality can still be obtained even if each display terminal shows a different display layout.

The present invention is not limited to the above exemplary embodiment and can be applied to a wide variety of uses.

For example, priorities can be assigned to terminals. That is, a control is performed such that a change demand from a terminal with a high priority is reflected immediately, while demands of a low priority are reflected only after a predetermined number of demands are accumulated. This is effective when, in a monitoring system, a terminal of a dedicated observer and general user terminals coexist.

Also, priorities can be assigned in accordance with the display size on each terminal. In this case, control is performed such that a demand from a terminal displaying a large window will have high priority and a demand from a terminal with a small thumbnail display will have low priority.

Third Exemplary Embodiment

In the previous exemplary embodiment, an area is divided in units of slices of the encoder. In the present exemplary embodiment, an area is divided in arbitrary shapes in units of macro blocks.

<Structure of an Image Transmission Unit of a Remote Display System (FIGS. 13 and 14)>

Figure 13:
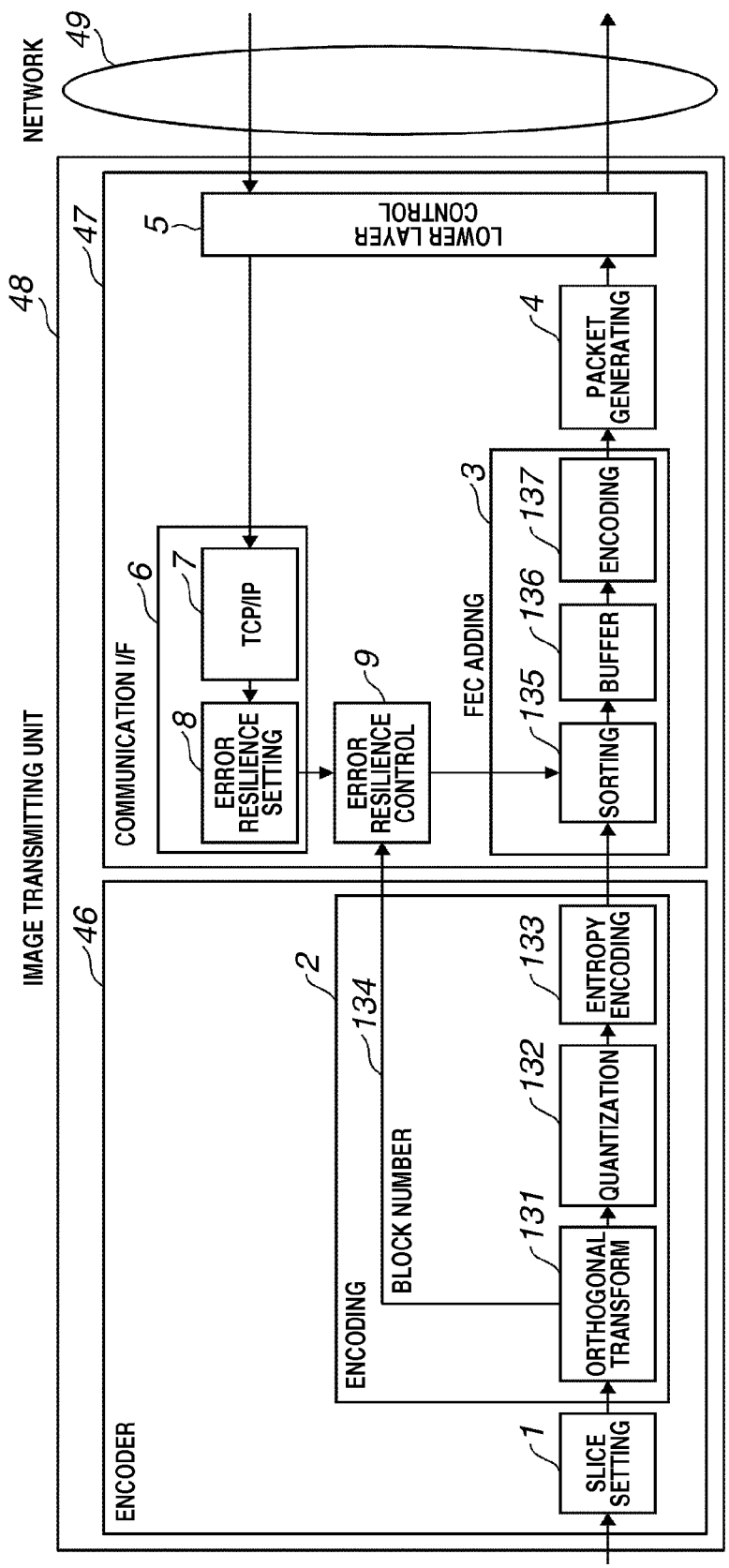
FIG. 13 is a block diagram showing an exemplary structure of an image transmitting unit of a remote display system according to a third exemplary embodiment.
Figure 14:
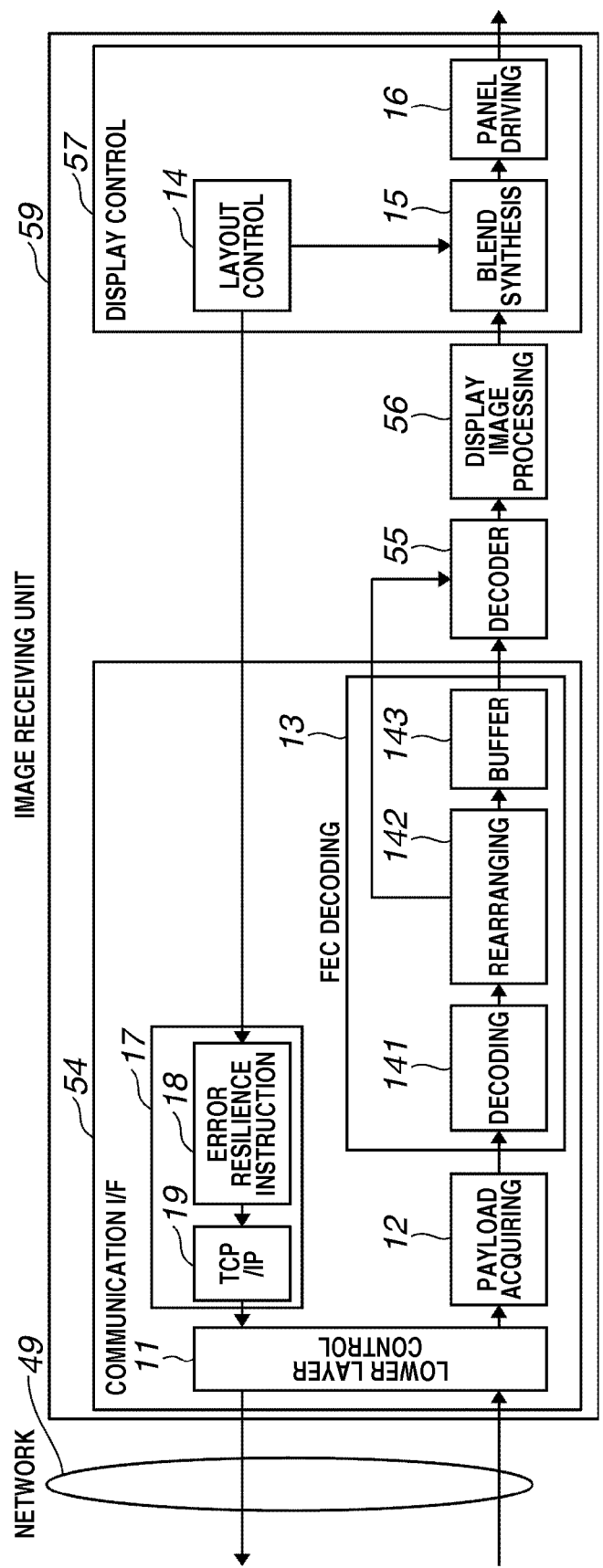
FIG. 14 is a block diagram showing an exemplary structure of an image receiving unit of the remote display system according to the third exemplary embodiment.

Block diagrams in FIGS. 13 and 14 will be used to describe the structure of an image transmission unit of a remote display system in the present exemplary embodiment. The same components as the previous exemplary embodiments are denoted by the same numbers and their descriptions are not repeated.

FIG. 13 is a block diagram showing the structure of an image transmitting unit in the present exemplary embodiment.

In the encoder 46, reference numeral 2 denotes an encoding unit. In the present exemplary embodiment, the procedure of Motion-JPEG is taken for encoding, and data is output to a communication interface with respect to each macro block. In the encoding unit 2, an orthogonal transform unit 131 performs a discrete cosine transform (DCT) operation, a quantization unit 132 reduces data in high-frequency regions, and an entropy encoding unit 133 performs Huffman encoding by performing a zigzag scan. The entropy encoding unit 133 outputs data in units of blocks without linking data of each macro block. At the same time, as shown by reference numeral 134, the communication interface is notified of the number of a coded macro block.

The communication interface 47 performs weighted error resilience encoding for each macro blocks, and performs packetization before transmission. The error resilience control unit 9 maintains the resilience strength setting for each position of the macro block based on setting in the error resilience setting unit 8. When a block number 134 is input from the encoder 46, a resilience strength signal according to its position is output.

The FEC adding unit 3 performs the error resilience encoding in accordance with the strength of each macro block. In the present exemplary embodiment, macro blocks are sorted out according to the resilience strength, and blocks with the same strength are grouped for the error resilience encoding. The FEC adding unit 3 includes a sorting unit 135, buffer memory 136, and an FEC encoding unit 137. The sorting unit 135 sorts out input macro blocks according to the resilience strength. The buffer memory 136 maintains macro block data for each group of the same resilience strength. Since macro blocks are in no particular order after sorting, the block data and block number are paired off thereafter in maintenance and processing. The FEC encoding unit 137 monitors a remaining amount of the buffer, and, if the amount of data becomes sufficient for FEC code creation, FEC encoding is performed. A coded data sequence is output to a packet generating unit 4. If there is resilience strength whose data amount is not sufficient to be FEC-codable, timing of a frame end or timeout is detected, and error resilience encoding is performed by other method and the encoded data is transmitted. Error resilience can be enhanced by the other method such as duplicate transmission of data, or encoding can be performed together with data of high level strength.

The packet generating unit 4 generates RTP or UDP/IP packets, and a lower layer control unit 5 controls the MAC layer and PHY layer protocols to transmit data packets of error resilience coded image.

FIG. 14 is a block diagram showing the structure of an image receiving unit in the present exemplary embodiment.

In the communication interface 54, image packets input via the lower layer control unit 11 are retrieved as payload data by a payload acquisition unit 12.

When a packet loss occurs, the FEC decoding unit 13 restores the lost packet using packets that have arrived. Then, the payload data that has been error resilience coded, is decoded to retrieve macro block data. In the present exemplary embodiment, payload data grouped by resilience strength is decoded and rearranged according to the macro block number. The FEC decoding unit 13 includes a decoding unit 141, a rearranging unit 142, and buffer memory 143. The decoding unit 141 decodes payload data that has been error resilience coded. The rearranging unit 142 rearranges data according to the macro block number and stores it in the buffer memory 143. When data of the Motion-JPEG decoder is ready in a processing unit, the rearranging unit 142 sends a ready signal to the decoder 55. The decoder 55 reads the macro block data in the buffer memory 143 to start decode processing.

Since processing performed after the decoder is the same as the above exemplary embodiments, its descriptions are not repeated.

According to the present exemplary embodiment, as described above, the same effect as the previous exemplary embodiments is obtained. In addition, since fine-grained settings can be made in units of macro blocks, image quality can be further improved.

The present invention is not limited to the above exemplary embodiment and can be applied to a wide variety of uses.

In the present invention, macro blocks of the same resilience strength are grouped to constitute packets, but each of macro blocks can be packetized. Further, while the redundant code such as the Reed-Solomon code is used as the error resilience code in the present exemplary embodiment, resilience can also be enhanced by the duplicate transmission of the same data.

In the present exemplary embodiment, the macro block of Motion-JPEG is used as a division unit, but an arbitrary division unit can be used in accordance with a compression method. For example, since the H.264 method allows macro blocks of a plural sizes such as 16×16 and 8×8 to coexist, further fine-grained division areas can be created.

Further, if a compression method uses no macro block, an area division can be made in units of pixels. For example, the number of constituent bits of image data can be reduced by cutting down the number of gradation levels, or compression can be performed using difference values with adjacent pixels. In such cases, as in the present exemplary embodiment, pixels of the same strength setting are grouped and error resilience encoding is performed to obtain the same effect. In such a case, if position information and data of pixels are paired off, the data amount will be too redundant. Accordingly, it would be better to exchange in advance correspondence information about the pixel position and strength setting, and the packet storage location.

The monitoring camera system is described in the present and previous exemplary embodiments. However, the present invention can be applied to an arbitrary network display system such as a VOD streaming system. In the present exemplary embodiment, the control operation is described when interference occurs with other image contents. However, the present invention can also be applied to a case where interference occurs with a display object of the user interface such as a button and frame.

In the present and previous exemplary embodiments, a hardware element can be realized by software and a software element can be realized by hardware. For example, processing in the error resilience control unit 9, FEC adding unit 3, and packet generating unit 4 can be realized by software, and control processing in the communication control CPUs 6 and 17 can be replaced with hardware logic.

According to the present invention, by setting the error resilience strength in accordance with the display state for each area of the screen, image quality of a focused area can be improved while maintaining a real-time characteristic.

Fourth Exemplary Embodiment

In the present exemplary embodiment, a display terminal is connected to a plurality of servers. Contents sent from the plurality of servers are laid out and displayed in the same screen. The display layout situation is detected in each area of the contents and the error resilience strength is lowered in areas transparently overlapped or hidden by other objects.

<Overall Structure of a Remote Display System (FIG. 15)>

Figure 15:
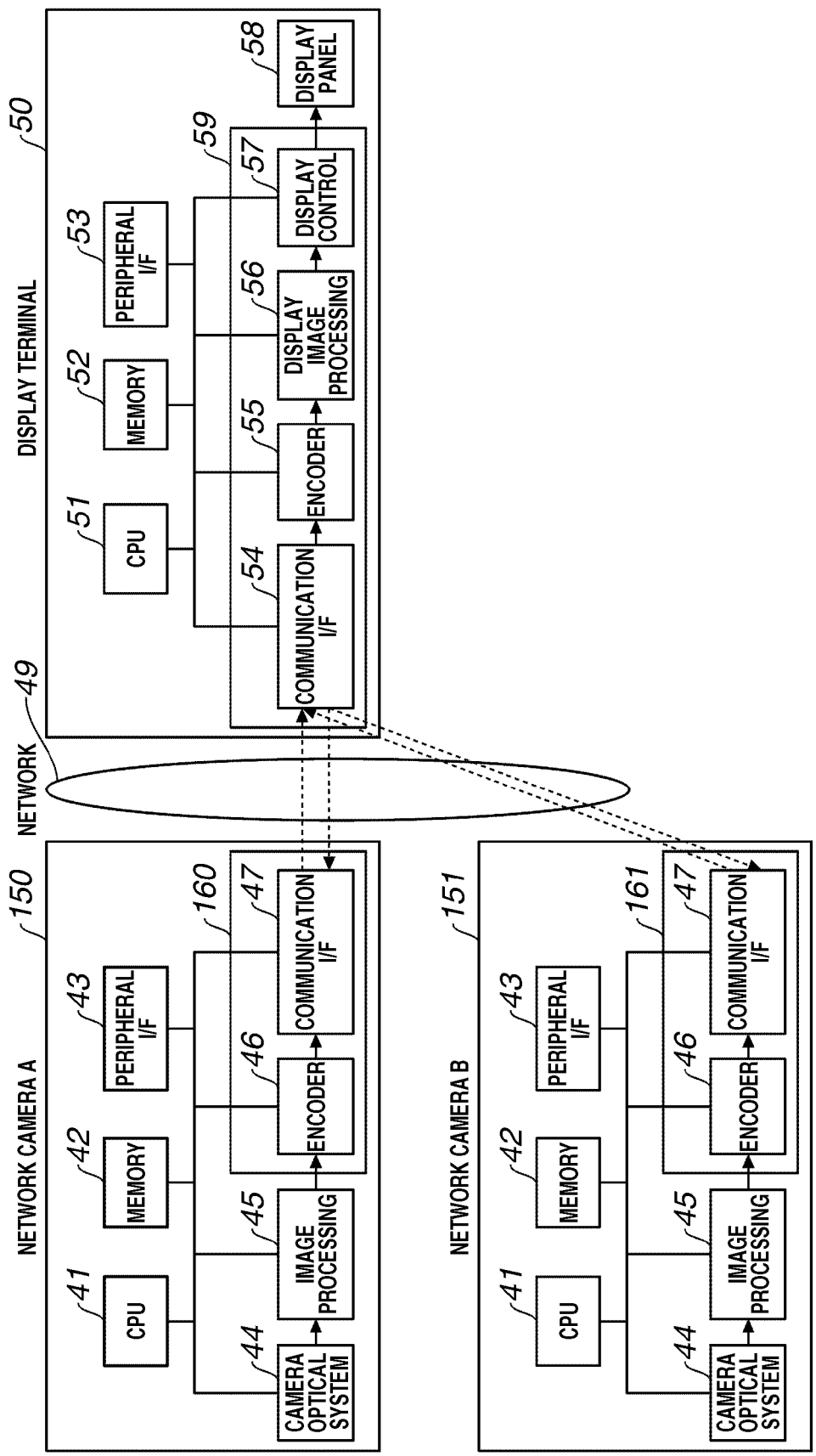
FIG. 15 is a block diagram showing an exemplary structure of a remote display system according to a fourth exemplary embodiment.

The block diagram in FIG. 15 will be used to describe the structure of a remote display system in the present exemplary embodiment. Compared with FIG. 4, the present exemplary embodiment has a structure in which two servers are connected to the system. The same components as FIG. 4 are denoted by the same numbers and their descriptions are not repeated.

A network camera server A 150 and a network camera server B 151 have the same structure as the network camera server 40 in FIG. 4. The servers 150 and 151 have image transmitting sections 160 and 161 respectively. A display terminal 50 receives content (camera images) sent from the servers 150 and 151, and lays out and displays the content in the screen.

<Structure of the Image Transmitting Sections and Image Receiving Unit (FIG. 16)>

Figure 16:
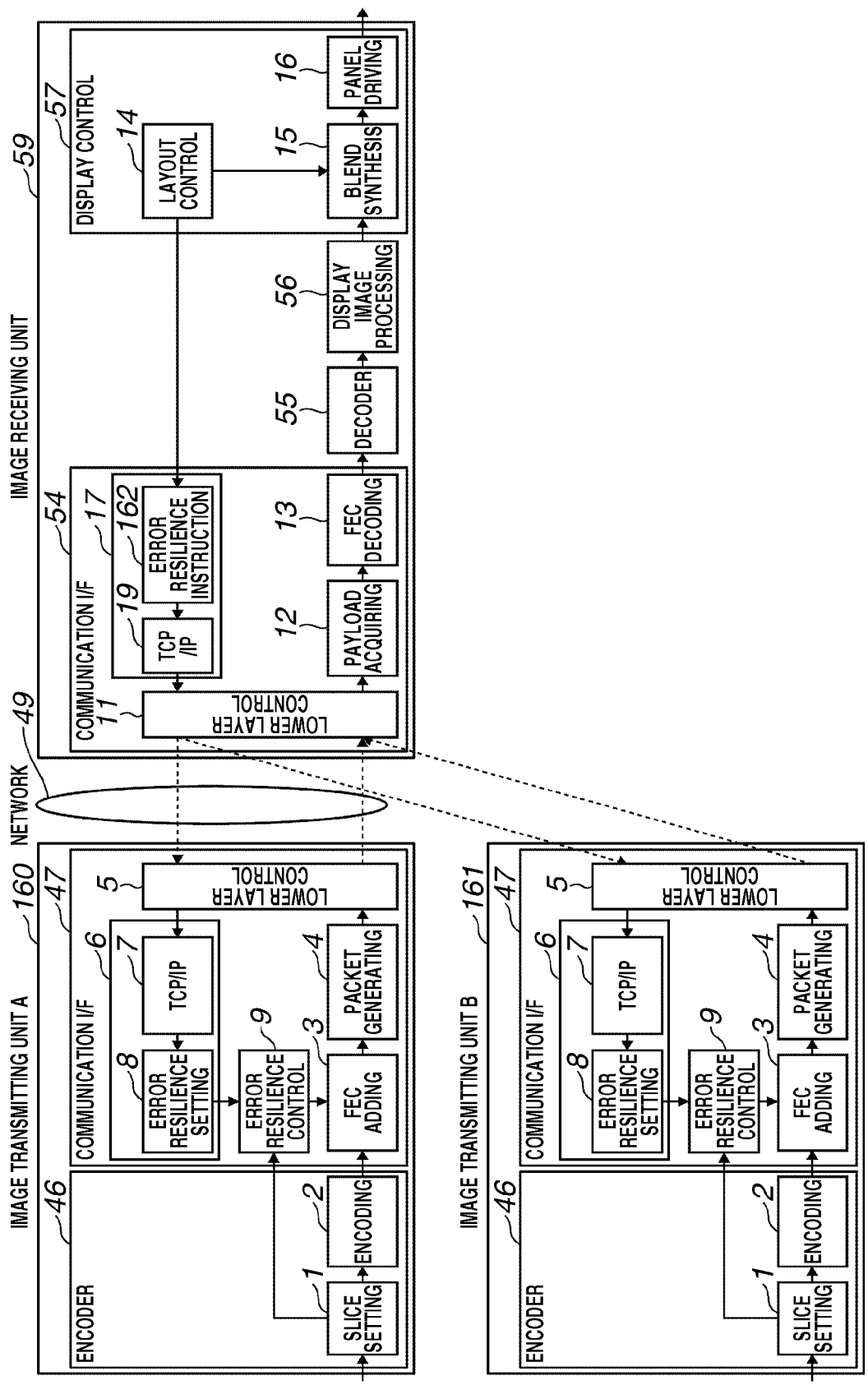
FIG. 16 is a block diagram showing an exemplary structure of an image transmitting unit and a receiving unit of the remote display system according to the fourth exemplary embodiment.

The block diagram in FIG. 16 will be used to describe the structure of the image transmitting sections 160 and 161, and the image receiving unit 59. The same components as FIG. 1 are denoted by the same numbers and their descriptions are not repeated.

An image transmitting unit A 160 and an image transmitting unit B 161 have the same structure as the image transmitting unit 48 in FIG. 1.

In the image receiving unit 59, reference numeral 162 denotes an error resilience instruction processing unit. The error resilience instruction processing unit 162 determines the error resilience strength of each area of the screen in accordance with the display layout, and sends a setting demand command to the server corresponding to the screen area.

<Description of the Flow of the Error Resilience Instruction Processing (FIG. 17)>

Figure 17:
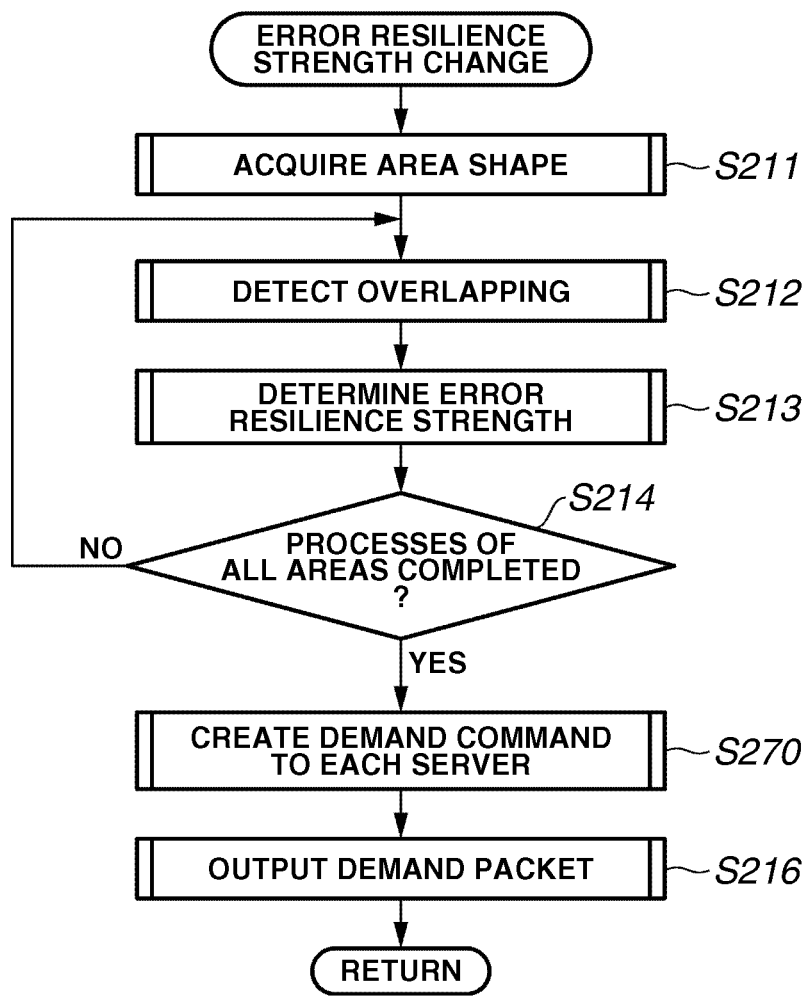
FIG. 17 is a flow chart showing the flow of the error resilience instruction processing according to the fourth exemplary embodiment.

The flow chart in FIG. 17 will be used to describe the flow of the error resilience instruction processing. The same components as the flow chart in FIG. 7 are denoted by the same numbers and their descriptions are not repeated. The error resilience strength is determined in accordance with the layout state of each area of contents, a setting demand command is created and is output to the server corresponding to the area.

In step S211 in FIG. 17, a division state of a content image is detected. In step S212, overlapping of the divided area images is detected based on information from the layout control unit 14. In step S213, the error resilience strength of each relevant area is determined based on information of the overlapping state. In step S214, it is determined whether determination processes of all areas is completed. If it is completed (YES in step S214), the processing proceeds to step S270. If there still remain some areas to be processed (NO in step S214), the processing proceeds to step S212 to process the next area. In step S270, a setting demand command of the error resilience strength is created. For example, as shown in FIG. 5, a command is created in a format in which the image area and resilience strength setting are associated with each other. A transmission destination of the command is set to be the server that sends data of the relevant image area. In step S216, the setting demand command is output to the TCP/IP control processing and the error resilience instruction processing ends.

In the above processing, it is possible to determine the error resilience strength according to the layout state of each area of contents and make a setting change demand to the server corresponding to the area.

According to the present invention, as described above, the same effect as the above exemplary embodiments can be obtained even when a plurality of servers is present.

In the present exemplary embodiment, an example of two servers is described, but the number of servers is arbitrary.

Further, when the error resilience strength of each area is determined in step S213, a determination can be made taking into consideration a server state that sends the content. For example, a transmission error rate of each server can be acquired separately, and it is determined that error resilience strength should be at a high level for an image area of a server showing a high error rate.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-244388 filed Aug. 25, 2005, which is hereby incorporated by reference herein in its entirety.

What is claimed is:

1. A remote display method having a transmission apparatus for transmitting image content data to a network, and a display terminal for receiving and reproducing/displaying the image content data, the method comprising:

transmitting the image data to which, in units of slices, an error resilience code is attached;

displaying the image content data on the display terminal; and determining error resilience strength such that error resilience strength of a slice including the image content data corresponding to a first area which is displayed can be higher than error resilience strength of a slice including the image content data corresponding to a second area which is hidden behind other windows, and such that the error resilience strength of a slice including the image content data corresponding to a third area which is displayed at a predetermined transmittance because of overlapping windows can be higher than the error resilience strength of the slice including the image content data corresponding to the second area.

2. A transmission apparatus having a transmission unit that transmits image content data to a network, and a display terminal that receives and reproduces/displays the image content data, the transmission apparatus comprising:

a communication unit configured to transmit the image content data to which, in units of slices, an error resilience code is attached;

a display unit configured to display the image content on the display terminal; and an error resilience strength determining unit configured to determine error resilience strength such that error resilience strength of a slice including the image content data corresponding to a first area which is displayed can be higher than error resilience strength of a slice including the image content data corresponding to a second area which is hidden behind other windows, and such that the error resilience strength of a slice including the image content data corresponding to a third area which is displayed at a predetermined transmittance because of overlapping windows can be higher than the error resilience strength of the slice including the image content data corresponding to the second area.

3. A remote display system having a transmission apparatus that transmits image content data to a network, and a display terminal that receives, and reproduces/displays the image content data, the display system comprising:

a communication unit configured to transmit the image content data to which, in units of slices, an error resilience code is attached;

a display unit configured to display the image content on the display terminal; and an error resilience strength determining unit configured to determine error resilience strength such that error resilience strength of a slice including the image content data corresponding to a first area which is displayed can be higher than error resilience strength of a slice including the image content data corresponding to a second area which is hidden behind other windows, and such that the error resilience strength of a slice including the image content data corresponding to a third area which is displayed at a predetermined transmittance because of overlapping windows can be higher than the error resilience strength of the slice including the image content data corresponding to the second area.

* * * * *